May 11, 1926.  T. KAKIUCHI  1,584,302
PLANT PROTECTOR
Filed July 29, 1925
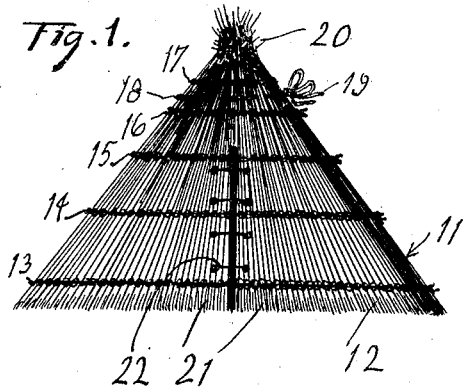
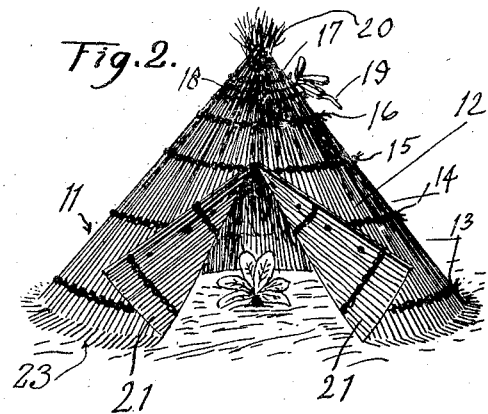
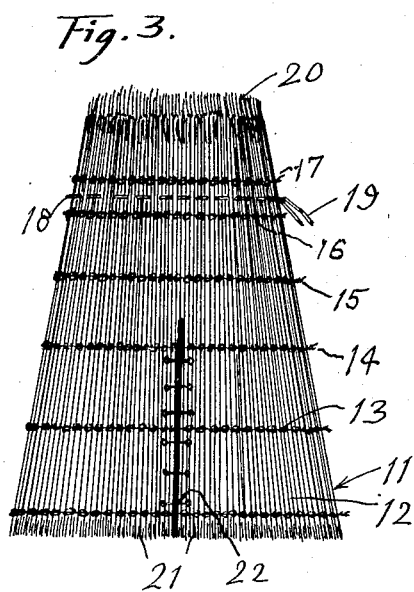
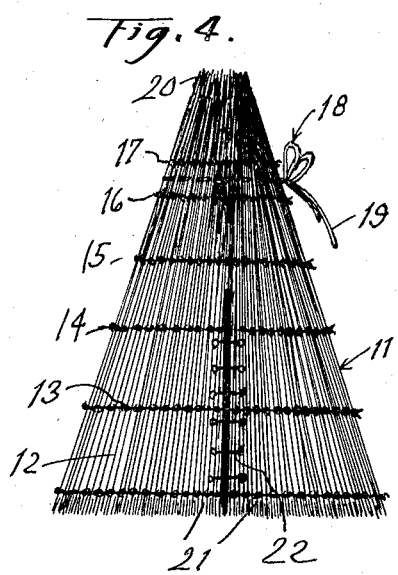
INVENTOR:
TSUNESHICHI KAKIUCHI.
BY ATTY.

Patented May 11, 1926.

1,584,302

UNITED STATES PATENT OFFICE.

TSUNESHICHI KAKIUCHI, OF EL CENTRO, CALIFORNIA.

PLANT PROTECTOR.

Application filed July 29, 1925. Serial No. 46,843.

The present invention has reference to improvements in plant protectors, adapted for the shielding of the young plants from excessive rain, from wind, and from excessive cold, and for the protection of the soil adjacent to the plant.

One of the objects of this invention is to provide a plant protector constructed of such material as to afford protection to small plants from frosts and insects, from birds and snails, to provide a shield constructed of inexpensive material, and a shield which may be quickly applied for use, and adjusted for particular requirements.

Heretofore, the practice has been to provide paper shields, which are, owing to lightness, difficult to apply, which will deteriorate on exposure, which are liable to be blown away by the wind, and which are likely to collapse and thereby prevent the proper growth of the plant.

I construct my improved plant protector of rice straw, which is more rigid than paper, which is adapted to shed rain, which is more durable than paper, which is an inexpensive material, and which may be emplaced readily in position for plant protection.

While the drawings delineate a preferred form of the invention, it is to be understood that minor changes, alterations and modifications, falling within the scope of the appended claims, may be resorted to if desired.

The present invention is constructed preferably in the form of a cone to be applied for use with the apex at the top, and, being made of many straw elements, these may be bent at the base, outwardly, and covered with soil or sand to secure the device in position. The straw elements, owing to their number and their self sufficiency, safeguard the effectiveness of the device, even should a few of them become broken.

The straw, naturally, is of a non-absorbent character relative to water, and therefore sheds the rain easily, and possesses characteristics of durability in withstanding the effects of time, the device lasting three years or more. The mode of assemblage of the straw elements allows the device to fold into compact limits for packing and storage, and, when set up and applied for use, the individual straw elements are packed more closely together at the top or apex of the cone, thus affording greater protection where needed.

In the drawings, Figure 1 is a side elevation of my improved plant protector. Fig. 2 is a perspective view showing the device applied for use, and showing the flaps raised for admitting sunlight to the interior. Fig. 3 is a side elevation of the device as adapted for taller plants, and shows the body open at the top. Fig. 4 is a side elevation of the taller device having the top adjusted to closed position.

Referring to the drawing, the body portion 11, has the form of a cone, and is constructed of rice straws 12. Cords 13, threaded through and among the straw elements, serve to bind them together, and are arranged in rows 14, 15, 16 and 17, disposed annularly around the body. The device, as shown in Fig. 1, may have relatively wide flaring sides, thereby adapting the device to small plants having their leaves lying relatively close to the ground. The device shown in Figs. 3 and 4, is adapted for tall plants and young trees.

Between the binding elements in rows 16 and 17, I have provided a tightening cord 18, threaded through the straws, allowing the protector to be adjusted, and having protruding ends 19, which may be drawn out to contract the apex 20, as shown in Figs. 1, 2, and 4. As adjusted in the position shown in Fig. 3, the device is open at the apex 20. If desired, the flaps 21, normally secured together by lacing cord 22, may be opened to admit a greater amount of sunlight to the interior of the device.

In the application of the device for use, the bottom extremities 23 of the individual straws are bent outwardly and covered with sand or soil, thereby preventing the device from being blown away by the wind. The conical form insures that the device will not be readily displaced by moderate winds.

The straw material, being woven in the manner shown, will not readily become displaced, and will shield the plants and ground from excessive heat and excessive rain, and yet allow circulation of the air between the interior and exterior of the device.

What is claimed is:

1. A plant protector comprising a wall formed from rice straws, binding cords securing the straws together, said wall being arranged in the form of a cone, flaps comprising a cover for an opening in the side of the wall, and a cord laced into contiguous edges of the flaps, said rice straws having their bottom extremities bent outwardly and covered with sand and soil.

2. A plant protector comprising a wall formed of rice straws arranged in conical form, binding cords interwoven among the straws, said wall being adjustable to open or closed position at the top, and a single cord at the top for securing the wall in closed position, said rice straws having their bottom extremities bent outwardly.

3. A plant protector comprising a conical wall consisting of rice straws and adapted to have an open or closed apex, and a single cord adjacent to the apex and adapted to secure the straws in the closed position of the wall, said rice straws having their bottom extremities bent outwardly.

4. A plant protector comprising a conical wall of rice straws and adjustable to open or closed positions at the apex thereof, and means for securing the straws together at the apex in the closed position of the wall, said rice straws having their bottom extremities bent outwardly.

5. A plant protector comprising a conical wall of rice straws and adjustable from maximum open position to closed position at the apex of the conical wall, a single cord attached to the wall adjacent to the apex and adapted to secure the wall in any adjusted position of the apex opening, and an outwardly extending portion on the bottom extremity of each rice straw.

In testimony whereof, I hereunto affix my signature.

TSUNESHICHI KAKIUCHI.